(12) United States Patent
Liu et al.

(10) Patent No.: US 12,317,200 B2
(45) Date of Patent: May 27, 2025

(54) POWER ADJUSTMENT METHOD AND ELECTRONIC DEVICE

(71) Applicant: VIVO MOBILE COMMUNICATION CO., LTD., Dongguan (CN)

(72) Inventors: Hui Liu, Dongguan (CN); Ningning Xie, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 366 days.

(21) Appl. No.: 17/891,100

(22) Filed: Aug. 18, 2022

(65) Prior Publication Data

US 2022/0394634 A1 Dec. 8, 2022

Related U.S. Application Data

(63) Continuation of application No. PCT/CN2021/077250, filed on Feb. 22, 2021.

(30) Foreign Application Priority Data

Feb. 26, 2020 (CN) .......................... 202010121402.2

(51) Int. Cl.
*H04W 52/36* (2009.01)
*H04W 52/14* (2009.01)
(Continued)

(52) U.S. Cl.
CPC ....... *H04W 52/367* (2013.01); *H04W 52/146* (2013.01); *H04W 52/241* (2013.01); *H04W 52/28* (2013.01)

(58) Field of Classification Search
CPC ............. H04W 52/367; H04W 52/146; H04W 52/241; H04W 52/28; H04W 52/20;
(Continued)

(56) References Cited

U.S. PATENT DOCUMENTS

2013/0301498 A1 11/2013 Kanamarlapudi et al.
2014/0086050 A1* 3/2014 Swann .................. H04W 72/54
370/235
(Continued)

FOREIGN PATENT DOCUMENTS

CN 108990036 A 12/2018
CN 109274441 A 1/2019
(Continued)

OTHER PUBLICATIONS

International Search Report issued in corresponding International Application No. PCT/CN2021/077250, mailed May 10, 2021, 4 pages.
(Continued)

*Primary Examiner* — Eugene Yun
(74) *Attorney, Agent, or Firm* — IPX PLLC

(57) ABSTRACT

A power adjustment method and an electronic device are provided. The method includes: detecting whether first information meets a first preset condition, where the first information includes at least one of the following: a first retransmission rate for uplink data, an actual transmission power for uplink data, or a first maximum transmission rate for uplink data, where the first maximum transmission power is a power threshold for transmitting the uplink data configured by a network device for the electronic device; and in a case that the first information meets the first preset condition, using a preset power control algorithm to adjust the first maximum transmission power to a target transmission power, where the target transmission power is greater than the first maximum transmission power and less than or equal to an inherent maximum transmission power of a radio frequency device of the electronic device.

18 Claims, 3 Drawing Sheets

| An electronic device detects whether first information meets a first preset condition | — 201 |

| In a case that the first information meets the first preset condition, the electronic device uses a preset power control algorithm to adjust a first maximum transmission power to a target transmission power | — 202 |

(51) Int. Cl.
*H04W 52/24* (2009.01)
*H04W 52/28* (2009.01)

(58) Field of Classification Search
CPC ... H04W 52/26; H04W 52/246; H04W 52/48; H04W 52/267; H04W 52/288; Y02D 30/70
USPC ......................................................... 455/522
See application file for complete search history.

(56) References Cited

U.S. PATENT DOCUMENTS

| | | |
|---|---|---|
| 2014/0219192 A1 | 8/2014 | Yang et al. |
| 2018/0279274 A1 | 9/2018 | Sun et al. |

FOREIGN PATENT DOCUMENTS

| | | |
|---|---|---|
| CN | 109922468 A | 6/2019 |
| CN | 110689899 A | 1/2020 |
| CN | 111343710 A | 6/2020 |
| JP | 06276149 A | 9/1994 |
| JP | 2015521426 A | 7/2015 |
| WO | 2005086519 A1 | 9/2005 |
| WO | 2013141791 A1 | 9/2013 |
| WO | 2018160130 A1 | 9/2018 |

OTHER PUBLICATIONS

Nortel, "UL System Level Performance Evaluation for E-UTRA", 3GPP TSG-RAN1 WG1 #42bis R1-051160, Oct. 2005.
Extended European Search Report issued in related European Application No. 21761034.4, mailed Jul. 6, 2023, 10 pages.
Notice of reason of refusal issued in related Japanese Application No. 2022-550903, mailed Aug. 1, 2023, 5 pages.
First Office Action issued in related Chinese Application No. 202010121402.2, mailed Sep. 22, 2022, 4 pages.

\* cited by examiner

POWER ADJUSTMENT METHOD AND ELECTRONIC DEVICE

CROSS-REFERENCE TO RELATED APPLICATIONS

This application is a continuation of International Application No. PCT/CN2021/077250, filed on Feb. 22, 2021, which claims priority to Chinese Patent Application No. 202010121402.2, filed on Feb. 26, 2020. The entire contents of each of the above-identified applications are expressly incorporated herein by reference.

TECHNICAL FIELD

Embodiments of the present disclosure relate to the field of communications technologies, and in particular to a power adjustment method and an electronic device.

BACKGROUND

Generally, a network device can configure a maximum uplink power (that is, a maximum power that can be used to transmit uplink data) for an electronic device according to an antenna radiation capability of the electronic device, interference of each electronic device in a network, and a use scenario for the electronic device, so that the electronic device can transmit the uplink data to the network device by using an uplink power less than the maximum uplink power.

However, in some scenarios (such as a game scenario, a video scenario), the electronic device has a relatively high demand for data transmission (such as a transmission rate demand, a transmission delay demand). Therefore, when the electronic device transmits the uplink data by using the uplink power in the foregoing method, an abnormal phenomenon (such as a great delay, a network lag, or a call failure) will occur in uplink transmission, which will result in poor transmission performance of the electronic device.

SUMMARY

Embodiments of the present disclosure provide a power adjustment method and an electronic device.

According to a first aspect of an embodiment of the present disclosure, a power adjustment method is provided, which is applied to an electronic device and includes: detecting whether first information meets a first preset condition, where the first information includes at least one of the following: a first retransmission rate for uplink data, an actual transmission power for uplink data, or a first maximum transmission rate for uplink data, where the first maximum transmission power is a power threshold for transmitting the uplink data configured by a network device for the electronic device; and in a case that the first information meets the first preset condition, using a preset power control algorithm to adjust the first maximum transmission power to a target transmission power, where the target transmission power is greater than the first maximum transmission power and less than or equal to an inherent maximum transmission power of a radio frequency device of the electronic device.

According to a second aspect of an embodiment of the present disclosure, an electronic device is provided and includes: a detecting module and an adjusting module; where the detecting module is configured to detect whether first information meets a first preset condition, where the first information includes at least one of the following: a first retransmission rate for uplink data, an actual transmission power for uplink data, or a first maximum transmission power for uplink data, where the first maximum transmission power is a power threshold for transmitting the uplink data configured by a network device for the electronic device. The adjusting module is configured to use, in a case that the first information meets the first preset condition, a preset power control algorithm to adjust the first maximum transmission power to a target transmission power, where the target transmission power is greater than the first maximum transmission power, and less than or equal to an inherent maximum transmission power of a radio frequency device of the electronic device.

According to a third aspect of an embodiment of the present disclosure, an electronic device is provided, where the electronic device includes a processor, a memory, and a computer program that is stored in the memory and that can be run on the processor, and when the computer program is executed by the processor, the steps of the power adjustment method according to the first aspect are implemented.

According to a fourth aspect of an embodiment of the present disclosure, a computer readable storage medium is provided, where the computer readable storage medium stores a computer program, and when the computer program is executed by a processor, the steps of the power adjustment method according to the first aspect are implemented.

In an embodiment of the present disclosure, the electronic device can detect the retransmission rate for the uplink data, the actual transmission power for the uplink data, and the maximum transmission power for the uplink data, and determine whether such data meets the first preset condition, so that when such data meets the first preset condition, the first maximum transmission power can be adjusted to the target transmission power through the preset power control algorithm. In a case that a function for the electronic device to run some application programs is abnormal, the electronic device can adjust the first maximum transmission power to the target transmission power through the preset power control algorithm according to the retransmission rate for the uplink data, the actual transmission power for the uplink data, and/or the maximum transmission power for the uplink data in a case that such information meets the first preset condition, so that the electronic device can implement transmission of the uplink data through an adjusted transmission power. Therefore, the transmission performance of the electronic device can be improved.

DETAILED DESCRIPTION

Figure 1:
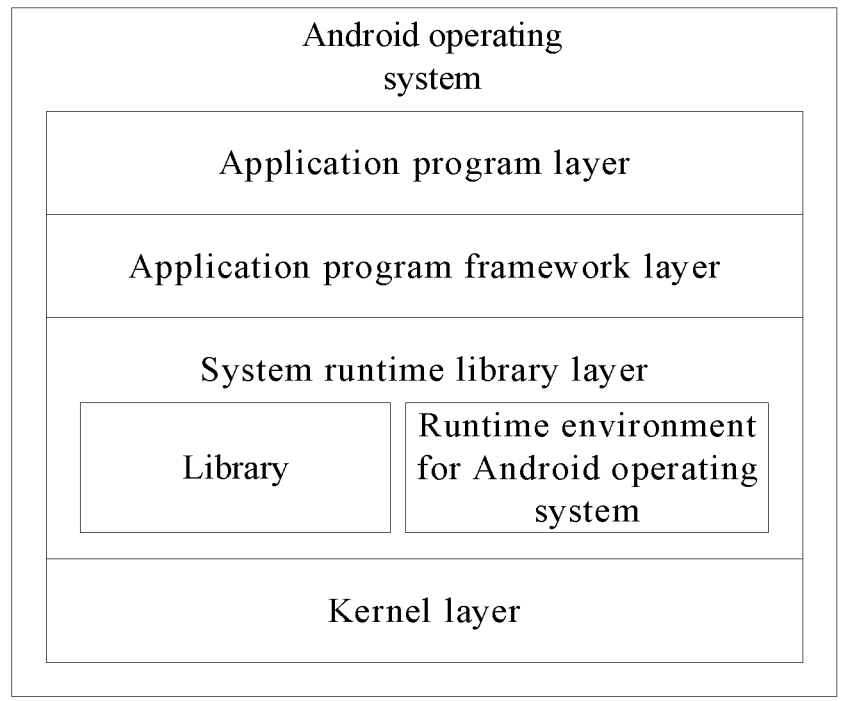
FIG. 1 is a schematic architectural diagram of an Android operating system according to an embodiment of the present disclosure.

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In the specification and claims of the embodiments of the present disclosure, the terms such as "first" and "second" are used to distinguish between different objects, but are not used to describe a particular sequence of the objects. For example, a first preset condition, a second preset condition, and the like are used to distinguish different preset conditions, but are not used to describe a specific order of the preset conditions.

In the description of the embodiments of the present disclosure, unless otherwise specified, the meaning of "multiple" means two or more. For example, multiple elements refer to two elements or more than two elements.

The term "and/or" in this specification describes an association relationship of associated objects, indicating that three relationships may exist. For example, a display panel and/or a backlight may indicate three cases: only the display panel exists, both the display panel and the backlight exist, and only the backlight exists. A character "/" in this specification indicates an "or" relationship between associated objects. For example, input/output indicates input or output.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

Embodiments of the present disclosure provide a power adjustment method and an electronic device. In a case that a function for the electronic device to run some application programs is abnormal, the electronic device can adjust a first maximum transmission power to a target transmission power through a preset power control algorithm according to a retransmission rate for uplink data, an actual transmission power for the uplink data, and/or the maximum transmission power for the uplink data in a case that such information meets a first preset condition. Therefore, the electronic device can implement transmission of uplink data through an adjusted transmission power, so the transmission performance of the electronic device can be improved.

The power adjustment method and the electronic device provided according to the embodiments of the present disclosure can be applied to adjustment of an upper limit of a transmission power of the electronic device.

The electronic device in the embodiments of the present disclosure may be an electronic device with an operating system. The operating system may be an Android operating system, or may be an iOS operating system or other operating systems, which is not specifically limited in the embodiments of the present disclosure.

The following uses an Android operating system as an example to describe a software environment to which a power adjustment method according to an embodiment of the present disclosure is applied.

FIG. 1 is a schematic architectural diagram of an Android operating system according to an embodiment of the present disclosure. In FIG. 1, an architecture of the Android operating system includes 4 layers: an application program layer, an application program framework layer, a system runtime library layer, and a kernel layer (in some embodiments, may be a Linux kernel layer).

The application program layer includes various application programs (including a system application program and a third-party application program) in the Android operating system.

The application program framework layer is an application program framework, and a developer may develop some application programs based on the application program framework layer while conforming to a rule for developing the application program framework.

The system runtime library layer includes a library (also referred to as a system library) and a runtime environment for the Android operating system, and the library mainly provides various resources required for the Android operating system. The runtime environment for the Android operating system is used to provide the Android operating system with a software environment.

The kernel layer is an operating system layer of the Android operating system, and is the lowest layer of software levels of the Android operating system. The kernel layer provides the Android operating system with a core system service and a hardware-related driver based on the Linux kernel.

Taking the Android operating system as an example, in this embodiment of the present disclosure, a developer can develop and implement, based on the system architecture of the Android operating system as shown in FIG. 1, a software program for the power adjustment method according to this embodiment of the present disclosure, so that the power adjustment method can be performed based on the Android operating system as shown in FIG. 1. That is, a processor or an electronic device can implement the power adjustment method according to this embodiment of the present disclosure by miming the software program in the Android operating system.

The electronic device in this embodiment of the present disclosure may be a mobile electronic device or a non-mobile electronic device. For example, the mobile electronic device may be a mobile phone, a tablet computer, a laptop computer, a palmtop computer, an in-vehicle terminal, a wearable device, an Ultra-Mobile Personal Computer (UMPC), a netbook, or a Personal Digital Assistant (PDA). The non-mobile electronic device may be a Personal Computer (PC), a TeleVision (TV), an automated teller machine, or a self-service machine. This is not specifically limited in this embodiment of the present disclosure.

A power adjustment method and an electronic device provided according to embodiments of the present disclosure are described in detail below with reference to the accompanying drawings and through embodiments and application scenarios thereof.

In an embodiment of the present disclosure, when a user uses a function (for example, a video call function, a video play function, or a game function) in an application program of the electronic device, the electronic device can display a function interface corresponding to the function, so as to show, through the function interface, an image played in real time to the user. However, because a data transmission power of the electronic device has an upper limit, and when a data transmission power required for some application programs is relatively great, a current data transmission power of the electronic device may not meet the needs of the electronic device. Therefore, an abnormal situation (such as image lag, low image definition, or delayed play of an image) will occur on the function interface of the electronic device. To avoid these abnormal situations, in this solution, according to a data transmission situation (such as a retransmission rate, an actual transmission power) of a currently running application program, it can be determined by the electronic device whether the upper limit of the data transmission power of the electronic device is adjusted. For example, when the data transmission situation meets a preset condition (a retransmission rate is great, or an actual transmission power is approximate to the upper limit of the data transmission power), the electronic device can adjust the upper limit of the data transmission power of the electronic device, so that the electronic device can implement transmission of the uplink data through a greater actual transmission power for the uplink data, so as to resolve a problem of poor transmission performance of the electronic device.

Figure 2:
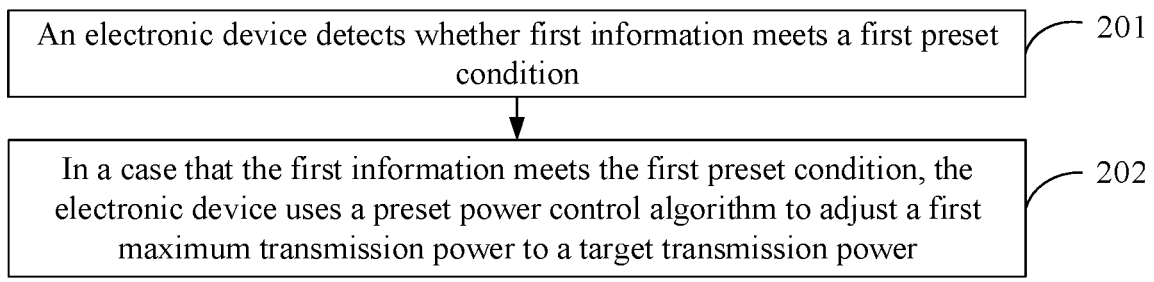
FIG. 2 is a first schematic diagram of a power adjustment method according to an embodiment of the present disclosure.

For a power adjustment method according to an embodiment of the present disclosure, FIG. 2 shows a flowchart of the power adjustment method according to this embodiment of the present disclosure. The method can be applied to an electronic device having the Android operating system shown in FIG. 1. As shown in FIG. 2, the power adjustment method provided according to this embodiment of the present disclosure may include the following step 201 and step 202.

Step 201: An electronic device detects whether first information meets a first preset condition.

In this embodiment of the present disclosure, the first information includes at least one of the following: a first retransmission rate for uplink data, an actual transmission power for uplink data, or a first maximum transmission power for uplink data, where the first maximum transmission power is a power threshold for transmitting the uplink data configured by a network device for the electronic device.

In this embodiment of the present disclosure, in a case that the electronic device runs an application program, since data transmission power of the electronic device has an upper limit, and when a data transmission power required for the application program is relatively great, a function interface of the electronic device will become abnormal. The electronic device can detect the first retransmission rate for the uplink data, the actual transmission power for the uplink data, and the first maximum transmission power for the uplink data. Therefore, when the first retransmission rate for the uplink data, the actual transmission power for the uplink data, and the first maximum transmission power for the uplink data meets a first preset condition, the electronic device can adjust the first maximum transmission power, so that a problem of poor transmission performance of the electronic device can be resolved.

For example, in this embodiment of the present disclosure, the uplink data may be uplink data corresponding to a video call, uplink data corresponding to video play, or uplink data corresponding to a game, or the like; and the first retransmission rate is a ratio of a data volume repeatedly sent by the electronic device to the network device to all data volume.

For example, in this embodiment of the present disclosure, the electronic device can detect the first retransmission rate for the uplink data and the actual transmission power for the uplink data in real time; and the electronic device can locally obtain the first maximum transmission power for the uplink data pre-configured by the network device for the electronic device.

For example, in this embodiment of the present disclosure, the first preset condition includes at least one of the following: the first retransmission rate is greater than or equal to a first preset threshold; first duration is greater than or equal to first preset duration, and the actual transmission power is less than an inherent maximum transmission power of a radio frequency device of the electronic device, and the first duration is duration for which the actual transmission power is equal to the first maximum transmission power; or the first maximum transmission power is less than an inherent maximum transmission power.

For example, in this embodiment of the present disclosure, the electronic device can detect the first retransmission rate for the uplink data when an abnormal phenomenon occurs in a function interface of an application program, and determine whether the first retransmission rate is greater than or equal to the first preset threshold; detect the actual transmission power for the uplink data and the first maximum transmission power for the uplink data, and determine whether duration for which the actual transmission power for the uplink data is equal to the first maximum transmission power is greater than or equal to first preset duration; and determine whether the actual transmission power for the uplink data is less than the inherent maximum transmission power of the radio frequency device of the electronic device.

For example, in this embodiment of the present disclosure, the first preset condition may be a condition preset in the electronic device; or the first preset condition may be a preset condition set by a user when setting an application program.

For example, in this embodiment of the present disclosure, the first information can further include at least one of the following: a first bit error rate for downlink data and first scenario information of the electronic device. The first scenario information is used to indicate at least one of the following: a screen status of the electronic device, whether the electronic device detects a user's input, a network status of the electronic device, or a current application scenario of the electronic device.

For example, in this embodiment of the present disclosure, the downlink data may be data sent by the network device to the electronic device.

For example, in this embodiment of the present disclosure, the screen status of the electronic device may be a non-screen-off status or a screen-off status; the network status of the electronic device may be a data transmission status or non-data transmission status when the network is connected; and a current application scenario for the electronic device may be a game running scenario, a video call scenario, a video play scenario, or the like.

For example, in this embodiment of the present disclosure, the first preset condition further includes at least one of the following: the first bit error rate is less than or equal to a second preset threshold; the electronic device is in the non-screen-off status; the electronic device detects a user's input; it is detected that the electronic device is in a network connection status, and duration for uplink data transmission in the network connection status is greater than or equal to second preset duration; or the current application scenario of the electronic device is a preset application scenario.

For example, in this embodiment of the present disclosure, the non-screen-off status for the electronic device may be a screen-locked status or a screen-unlocked status; the current application scenario of the electronic device is a preset application scenario, which may include any one of the following scenarios: a game running scenario, a video call scenario, a video play scenario, or the like.

For example, in this embodiment of the present disclosure, the electronic device can detect the first retransmission rate for the uplink data when an abnormal phenomenon occurs in a function interface of an application program, and determine whether the first retransmission rate is greater than or equal to the first preset threshold; detect the actual transmission power for the uplink data and the first maximum transmission power for the uplink data, and determine whether the duration for which the actual transmission power for the uplink data is equal to the first maximum transmission power is greater than or equal to the first preset duration; determine whether the actual transmission power for the uplink data is less than the inherent maximum transmission power of the radio frequency device of the electronic device; detect the first bit error rate for the downlink data, and determine whether the first bit error rate is less than or equal to the second preset threshold; detect whether the electronic device is in the non-screen-off status; detect whether the electronic device responds to the user's input; detect whether the electronic device is in the network connection status and whether the duration for uplink data transmission in the network connection status is greater than or equal to the second preset duration; and detect whether the current application scenario of the electronic device is the preset application scenario.

Step 202: In a case that the first information meets the first preset condition, the electronic device uses a preset power control algorithm to adjust the first maximum transmission power to a target transmission power.

In this embodiment of the present disclosure, the target transmission power is greater than the first maximum transmission power and less than or equal to the inherent maximum transmission power of the radio frequency device of the electronic device.

For example, in this embodiment of the present disclosure, the first information meeting the first preset condition can include at least one of the following: the first retransmission rate for the uplink data is greater than or equal to the first preset threshold, first duration for which the actual transmission power for the uplink data is equal to the first maximum transmission power is greater than or equal to the first preset duration, and the actual transmission power for the uplink data is less than the inherent maximum transmission power of the radio frequency device of the electronic device, the first maximum transmission power for the uplink data is less than the inherent maximum transmission power, the first bit error rate for the downlink data is less than or equal to the second preset threshold, the electronic device is in the non-screen-off status, it is detected that the electronic device responds to the user's input, it is detected that the electronic device is in the network connection status, and duration for uplink data transmission in the network connection status is greater than or equal to the second preset duration, and the current application scenario of the electronic device is the preset application scenario.

It can be understood that the actual transmission power of the electronic device before the first maximum transmission power is adjusted is less than the actual transmission power of the electronic device after the first maximum transmission power is adjusted.

For example, in this embodiment of the present disclosure, the preset power control algorithm is a preset calculation process for obtaining the target transmission power by using the first retransmission rate for the uplink data, the actual transmission power for the uplink data, the first maximum transmission power for the uplink data, the inherent maximum transmission power of the radio frequency device of the electronic device, and the first bit error rate for the downlink data.

For example, in this embodiment of the present disclosure, after the target transmission power is obtained by using the preset power control algorithm, the electronic device adjusts a value of the first maximum transmission power in a locally set parameter to a value corresponding to the target transmission power.

For example, in this embodiment of the present disclosure, if the first retransmission rate is relatively great (that is, the first retransmission rate is greater than or equal to the first preset threshold), it indicates that certain uplink data corresponding to an application program is transmitted for several times in the electronic device, that is, the uplink data is transmitted unsuccessfully for several times. Therefore, the electronic device can transmit the uplink data with a greater actual transmission power by adjusting the first maximum transmission power.

For example, in this embodiment of the present disclosure, if the actual transmission power is relatively great (that is, the actual transmission power is equal to the first maximum transmission power), and as the actual transmission power is relatively great, the transmission time is relatively long (that is, the first duration is greater than or equal to the first preset duration), it indicates that the upper limit of the data transmission power (that is, the first maximum transmission power) currently configured by the electronic device is relatively small and cannot meet the data transmission requirements. Therefore, the electronic device can transmit the uplink data with a greater actual transmission power by adjusting the first maximum transmission power.

For example, in this embodiment of the present disclosure, the electronic device can adjust the first maximum transmission power when the first retransmission rate for the uplink data is greater than or equal to the first preset threshold, the duration for which the actual transmission power for the uplink data is equal to the first maximum transmission power is greater than or equal to the first preset duration, the actual transmission power for the uplink data is less than the inherent maximum transmission power of the radio frequency device of the electronic device, to resolve the problem of poor transmission performance of the electronic device. In some embodiments, the electronic device can adjust the first maximum transmission power when the first retransmission rate for the uplink data is greater than or equal to the first preset threshold, the duration for which the actual transmission power for the uplink data is equal to the first maximum transmission power is greater than or equal to the first preset duration, the actual transmission power for the uplink data is less than the inherent maximum transmission power of the radio frequency device of the electronic device, the first bit error rate for the downlink data is less than or equal to the second preset threshold, the electronic device is in the non-screen-off status, the electronic device responds to the user's input, the electronic device is in the network connection status and the duration for uplink data transmission in the network connection status is greater than or equal to the second preset duration, and the current application scenario of the electronic device is the preset application scenario, to resolve the problem of poor transmission performance of the electronic device.

For example, in this embodiment of the present disclosure, in a case that the first information does not meet the first preset condition, the electronic device may not adjust the first maximum transmission power, that is, continue performing data transmission with the first maximum transmission power.

This embodiment of the present disclosure provides a power adjustment method. The electronic device can detect the retransmission rate for the uplink data, the actual transmission power for the uplink data, and the maximum transmission power for the uplink data, and determine whether such data meets the first preset condition, so that when such data meets the first preset condition, the first maximum transmission power can be adjusted to the target transmission power through the preset power control algorithm. In a case that a function for the electronic device to run some application programs is abnormal, the electronic device can adjust the first maximum transmission power to the target transmission power through the preset power control algorithm according to the retransmission rate for the uplink data, the actual transmission power for the uplink data, and/or the maximum transmission power for the uplink data in a case that such information meets the first preset condition, so that the electronic device can implement transmission of the uplink data through an adjusted transmission power. Therefore, the transmission performance of the electronic device can be improved.

Figure 3:
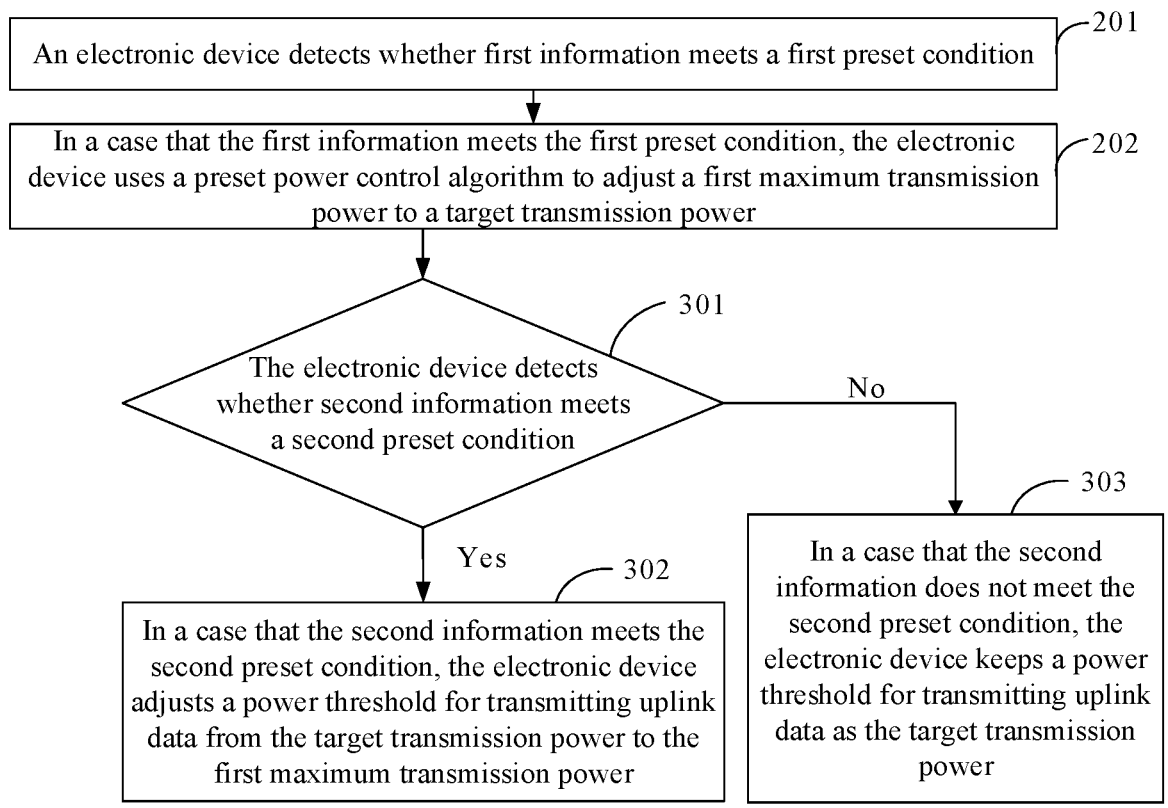
FIG. 3 is a second schematic diagram of the power adjustment method according to an embodiment of the present disclosure.

For example, in an embodiment of the present disclosure, with reference to FIG. 2, as shown in FIG. 3, after step 202, the power adjustment method provided according to this embodiment of the present disclosure further includes the following step 301 and step 302 (or step 303).

Step 301: The electronic device detects whether second information meets a second preset condition.

For example, in this embodiment of the present disclosure, the second information includes at least one of the following: a transmit power of the electronic device, a second retransmission rate for uplink data, a second bit error rate for downlink data, or second scenario information. The second scenario information is used to indicate at least one of the following: whether an abnormal phenomenon is detected in uplink transmission, a screen status of the electronic device, or a first application scenario in which the electronic device is currently in.

For example, in this embodiment of the present disclosure, the electronic device can detect the transmit power of the electronic device, the second retransmission rate for the uplink data, and the second bit error rate for the downlink data in real time; and the electronic device can obtain whether an abnormal phenomenon occurs in uplink transmission in the electronic device, the screen status of the electronic device, and a current application scenario of the electronic device.

For example, in this embodiment of the present disclosure, after the electronic device adjusts a first maximum transmission power for the uplink data to a target transmission power, the electronic device can detect the transmit power of the electronic device, the second retransmission rate for the uplink data, and the second bit error rate for the downlink data from transmission information of the uplink data at the current moment, and detect whether an abnormal phenomenon occurs in uplink transmission according to a running status of a current application program on the electronic device, the screen status of the electronic device, and an application program currently running on the electronic device.

For example, in this embodiment of the present disclosure, the second preset condition includes at least one of the following: second duration is greater than or equal to third preset duration, and the second duration is duration for which the transmit power is less than or equal to a third preset threshold; the second retransmission rate is less than a first retransmission rate, and a difference between the first retransmission rate and the second retransmission rate is less than or equal to a fourth preset threshold; the second bit error rate is greater than a first bit error rate, and a difference between the second bit error rate and the first bit error rate is greater than or equal to a fifth preset threshold; an abnormal phenomenon is detected in uplink transmission; the electronic device is in a screen-off status; or a first application scenario is different from at least one preset application scenario indicated by preset scenario information in the electronic device.

For example, in this embodiment of the present disclosure, the electronic device can detect the transmit power of the electronic device, and determine whether duration for which the transmit power is less than or equal to the third preset threshold is greater than or equal to the third preset duration; detect the second retransmission rate for the uplink data, and determine whether the second retransmission rate is less than the first retransmission rate, and whether the difference between the first retransmission rate and the second retransmission rate is less than or equal to the fourth preset threshold; detect the second bit error rate for the downlink data, and determine whether the second bit error rate is greater than the first bit error rate, and whether the difference between the second bit error rate and the first bit error rate is greater than or equal to the fifth preset threshold; detect whether an abnormal phenomenon occurs in the uplink transmission; detect whether the electronic device is in the screen-off status; and detect whether the current application scenario of the electronic device is a preset application scenario.

Step 302: In a case that the second information meets the second preset condition, the electronic device adjusts a power threshold for transmitting the uplink data from the target transmission power to the first maximum transmission power.

For example, in this embodiment of the present disclosure, the second information meeting the second preset condition can include at least one of the following: the second duration for which the transmit power of the electronic device is less than or equal to the third preset threshold is greater than or equal to the third preset duration, the second retransmission rate for the uplink data is less than the first retransmission rate, the difference between the first retransmission rate for the uplink data and the second retransmission rate is less than or equal to the fourth preset threshold, the second bit error rate for the downlink data is greater than the first bit error rate, the difference between the second bit error rate for the downlink data and the first bit error rate is greater than or equal to the fifth preset threshold, the electronic device detects that an abnormal phenomenon occurs in the uplink transmission, the electronic device is in the screen-off status, or the current application scenario of the electronic device is not a preset application.

For example, in this embodiment of the present disclosure, the electronic device adjusts the power threshold for transmitting the uplink data in a locally set parameter from a value corresponding to the target transmission power to a value corresponding to the first maximum transmission power.

For example, in this embodiment of the present disclosure, when the duration for which the transmit power is less than or equal to the third preset threshold is greater than or equal to the third preset duration; the second retransmission rate for the uplink data is less than the first retransmission rate, and the difference between the first retransmission rate and the second retransmission rate is less than or equal to the fourth preset threshold; the second bit error rate for the downlink data is greater than the first bit error rate, and the difference between the second bit error rate and the first bit error rate is greater than or equal to the fifth preset threshold; an abnormal phenomenon occurs in the uplink transmission; the electronic device is in the screen-off status; or the current application scenario of the electronic device is not the preset application scenario, the electronic device can adjust the power threshold for transmitting the uplink data from the target transmission power to the first maximum transmission power.

Step 303: In a case that the second information does not meet the second preset condition, the electronic device keeps the power threshold for transmitting the uplink data as the target transmission power.

It can be understood that, when the second information does not meet the second preset condition, the electronic device may not adjust the power threshold for transmitting the uplink data from the target transmission power to the first maximum transmission power, so that the electronic device can still implement transmission of the uplink data through a relatively great transmission power.

In this embodiment of the present disclosure, the electronic device can detect the transmit power of the electronic device, the second retransmission rate for the uplink data, the second bit error rate for the downlink data, the second scenario information, and the like, so that in a case that such data meets the second preset condition, the power threshold for transmitting the uplink data can be adjusted from the target transmission power to the first maximum transmission power, in order to release and increase the power threshold for transmitting the uplink data configured by the network device for the electronic device. Therefore, workload of the electronic device can be reduced, so that the transmission performance of the electronic device can be improved.

Figure 4:
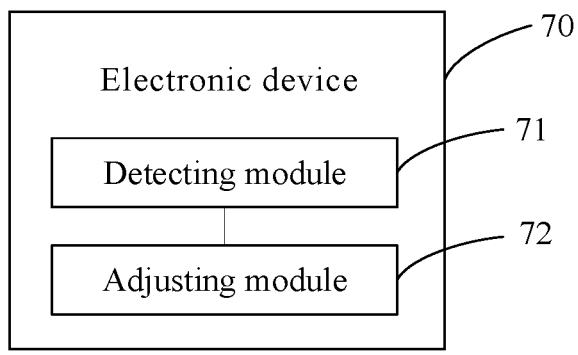
FIG. 4 is a schematic structural diagram of an electronic device according to an embodiment of the present disclosure.

FIG. 4 is a schematic structural diagram of an electronic device according to an embodiment of the present disclosure. As shown in FIG. 4, an electronic device 70 may include: a detecting module 71 and an adjusting module 72.

The detecting module 71 is configured to detect whether first information meets a first preset condition. The first information includes at least one of the following: a first retransmission rate for uplink data, an actual transmission power for uplink data, or a first maximum transmission rate for uplink data. The first maximum transmission power is a power threshold for transmitting the uplink data configured by a network device for the electronic device. The adjusting module 72 is configured to use, in a case that the first information meets the first preset condition, a preset power control algorithm to adjust the first maximum transmission power to a target transmission power. The target transmission power is greater than the first maximum transmission power and less than or equal to an inherent maximum transmission power of a radio frequency device of the electronic device.

In some embodiments, the first preset condition includes at least one of the following: the first retransmission rate is greater than or equal to a first preset threshold; first duration is greater than or equal to first preset duration, and the actual transmission power is less than the inherent maximum transmission power of the radio frequency device of the electronic device, and the first duration is duration for which the actual transmission power is equal to the first maximum transmission power; and the first maximum transmission power is less than the inherent maximum transmission power.

In some embodiments, the first information further includes at least one of the following: a first bit error rate for downlink data and first scenario information of the electronic device. The first scenario information is used to indicate at least one of the following: a screen status of the electronic device, whether the electronic device detects a user's input, a network status of the electronic device, or a current application scenario of the electronic device.

In some embodiments, the first preset condition further includes at least one of the following: the first bit error rate is less than or equal to a second preset threshold; the electronic device is in a non-screen-off status; the electronic device detects a user's input; the electronic device detects that the electronic device is in a network connection status, and duration for uplink data transmission in the network connection status is greater than or equal to second preset duration; or a current application scenario of the electronic device is a preset application scenario.

In some embodiments, the detecting module 71 is further configured to detect whether second information meets a second preset condition after the adjusting module 72 adjusts the first maximum transmission power to the target transmission power. The second information includes at least one of the following: a transmit power of the electronic device, a second retransmission rate for the uplink data, a second bit error rate for the downlink data, or second scenario information. The second scenario information is used to indicate at least one of the following: whether an abnormal phenomenon is detected in uplink transmission, a screen status of the electronic device, or a first application scenario in which the electronic device is currently in. The adjusting module 72 is further configured to adjust, in a case that the second information meets the second preset condition, a power threshold for transmitting the uplink data from the target transmission power to the first maximum transmission power.

In some embodiments, the second preset condition includes at least one of the following: second duration is greater than or equal to third preset duration, and the second duration is duration for which the transmit power is less than or equal to a third preset threshold; the second retransmission rate is less than a first retransmission rate, and a difference between the first retransmission rate and the second retransmission rate is less than or equal to a fourth preset threshold; the second bit error rate is greater than a first bit error rate, and a difference between the second bit error rate and the first bit error rate is greater than or equal to a fifth preset threshold; an abnormal phenomenon is detected in uplink transmission; the electronic device is in a screen-off status; or a first application scenario is different from at least one preset application scenario indicated by preset scenario information in the electronic device.

The electronic device provided in this embodiment of the present disclosure can implement processes that are implemented by the electronic device in the foregoing method embodiments. To avoid repetition, details are not described herein again.

An embodiment of the present disclosure provides an electronic device. In a case that a function for the electronic device to run some application programs is abnormal, the electronic device can adjust the first maximum transmission power to the target transmission power through the preset power control algorithm according to the retransmission rate for the uplink data, the actual transmission power for the uplink data, and/or the maximum transmission power for the uplink data in a case that such information meets the first preset condition, so that the electronic device can implement transmission of the uplink data through an adjusted transmission power. Therefore, the transmission performance of the electronic device can be improved.

Figure 5:
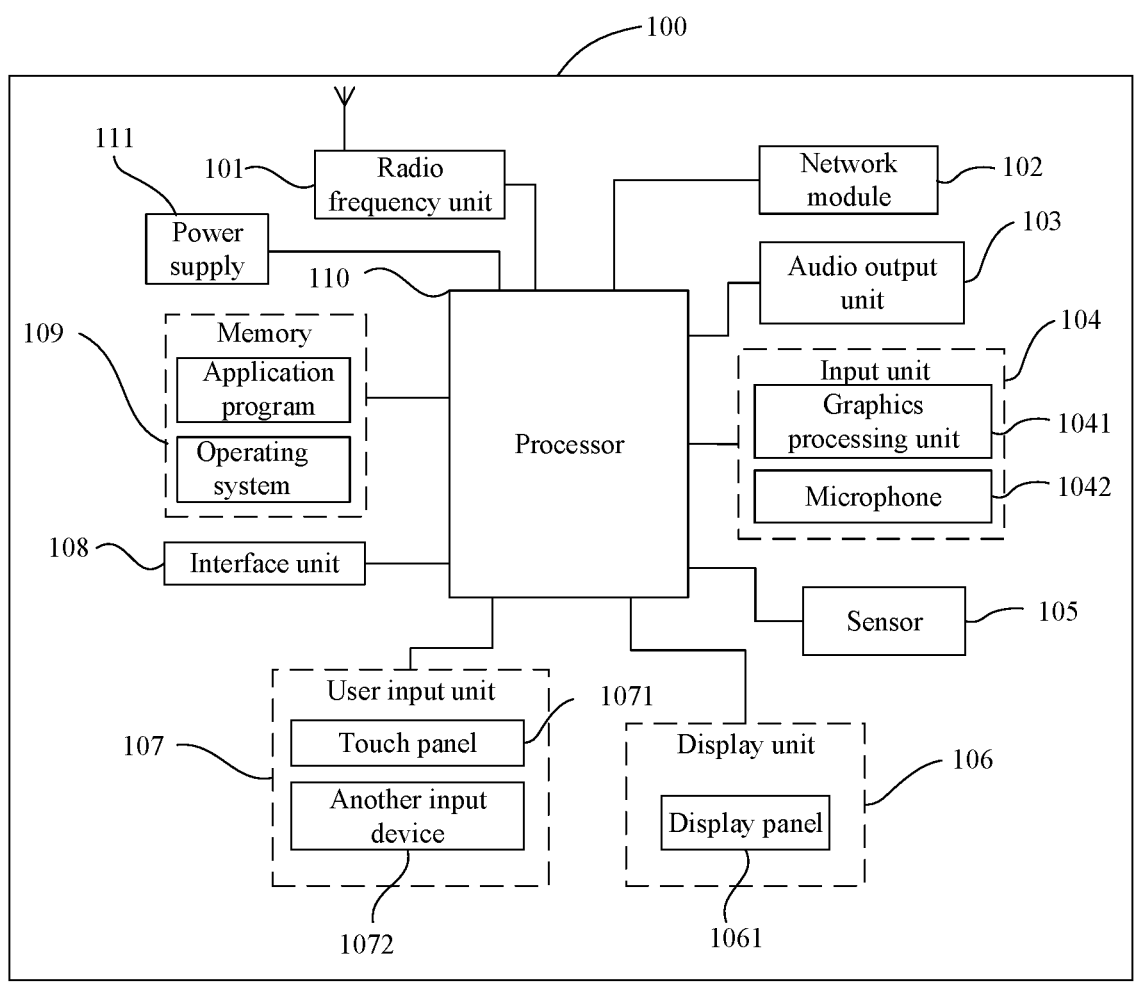
FIG. 5 is a schematic diagram of hardware of an electronic device according to an embodiment of the present disclosure.

FIG. 5 is a schematic diagram of hardware of an electronic device according to embodiments of the present disclosure. As shown in FIG. 5, an electronic device 100 includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components.

It should be noted that a person skilled in the art may understand that a structure of the electronic device shown in FIG. 5 constitutes no limitation on the electronic device. The electronic device may include more or fewer components than those shown in FIG. 5, or a combination of some components, or an arrangement of different components. In this embodiment of the present disclosure, the electronic device includes but is not limited to a mobile phone, a tablet computer, a notebook computer, a palmtop computer, an in-vehicle terminal, a wearable device, a pedometer, and the like.

The processor 110 is configured to detect whether first information meets a first preset condition, where the first information includes at least one of the following: a first retransmission rate for uplink data, an actual transmission power for uplink data, or a first maximum transmission rate for uplink data, and the first maximum transmission power is a power threshold for transmitting the uplink data configured by a network device for the electronic device; and in a case that the first information meets the first preset condition, use a preset power control algorithm to adjust the first maximum transmission power to a target transmission power. The target transmission power is greater than the first maximum transmission power and less than or equal to an inherent maximum transmission power of a radio frequency device of the electronic device.

An embodiment of the present disclosure provides an electronic device. In a case that a function for the electronic device to run some application programs is abnormal, the electronic device can adjust the first maximum transmission power to the target transmission power through the preset power control algorithm according to the retransmission rate for the uplink data, the actual transmission power for the uplink data, and/or the maximum transmission power for the uplink data in a case that such information meets the first preset condition, so that the electronic device can implement transmission of the uplink data through an adjusted transmission power. Therefore, the transmission performance of the electronic device can be improved.

It should be understood that, in this embodiment of the present disclosure, the radio frequency unit 101 may be configured to receive and send information or receive and send a signal in a call process. In some embodiments, after downlink data from a base station is received, the processor 110 processes the downlink data. In addition, uplink data is sent to the base station. Usually, the radio frequency unit 101 includes but is not limited to an antenna, at least one amplifier, a transceiver, a coupler, a low noise amplifier, a duplexer, and the like. In addition, the radio frequency unit 101 can further communicate with a network and another device through a wireless communications system.

The electronic device provides the user with wireless broadband Internet access through the network module 102, for example, helps the user receive and send e-mails, browse web pages, and access streaming media.

The audio output unit 103 can convert audio data received by the radio frequency unit 101 or the network module 102 or stored in the memory 109 into an audio signal and output the audio signal as a sound. In addition, the audio output unit 103 can further provide an audio output (for example, call signal received sound or message received sound) related to a specific function performed by the electronic device 100. The audio output unit 103 includes a loudspeaker, a buzzer, a telephone receiver, and the like.

The input unit 104 is configured to receive an audio signal or a video signal. The input unit 104 may include a Graphics Processing Unit (GPU) 1041 and a microphone 1042. The graphics processing unit 1041 processes image data of a static image or a video obtained by an image capturing apparatus (for example, a camera) in a video capturing mode or an image capturing mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 can receive sound and can process such sound into audio data. The processed audio data may be converted in a call mode into a format that can be sent by the radio frequency unit 101 to a mobile communication base station for outputting.

The electronic device 100 further includes at least one sensor 105, for example, a light sensor, a motion sensor, and another sensor. In some embodiments, the light sensor includes an ambient light sensor and a proximity sensor. The ambient light sensor may adjust luminance of the display panel 1061 based on brightness of ambient light. The proximity sensor may turn off the display panel 1061 and/or backlight when the electronic device 100 moves close to an ear. As a motion sensor, an accelerometer sensor may detect magnitude of acceleration in various directions (usually three axes), may detect magnitude and a direction of gravity when stationary, may be configured to identify an electronic device's postures (such as switching between a landscape mode and a portrait mode, related games, and magnetometer posture calibration), may perform functions related to vibration identification (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, or the like. Details are not described herein again.

The display unit 106 is configured to display information input by a user or information provided for a user. The display unit 106 may include the display panel 1061, and the display panel 1061 may be configured in a form of a Liquid Crystal Display (LCD), an Organic Light-Emitting Diode (OLED), or the like.

The user input unit 107 can be configured to receive entered number or character information, and generate key signal input related to user settings and function control of the electronic device. In some embodiments, the user input unit 107 includes a touch panel 1071 and another input device 1072. The touch panel 1071 is also referred to as a touchscreen, and may collect a touch operation performed by a user on or near the touch panel 1071 (such as an operation performed by a user on or near the touch panel 1071 by using any proper object or accessory, such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be implemented as a resistive type, a capacitive type, an infrared type, a surface acoustic wave type, or the like. The user input unit 107 may include other input devices 1072 in addition to the touch panel 1071. In some embodiments, the another input device 1072 may include but is not limited to: a physical keyboard, function keys (for example, a volume control key and an on/off key), a trackball, a mouse, or a joystick. Details are not described herein.

Further, the touch panel 1071 may cover the display panel 1061. When detecting a touch operation on or near the touch panel, the touch panel 1071 transmits the touch operation to the processor 110 to determine a type of a touch event. Then, the processor 110 provides corresponding visual output on the display panel 1061 based on the type of the touch event. Although the touch panel 1071 and the display panel 1061 in FIG. 5 are configured as two independent components to implement input and output functions of the electronic device, in some embodiments, the touch panel 1071 and the display panel 1061 may be integrated to implement the input and output functions of the electronic device. Details are not limited herein.

The interface unit 108 is an interface for connecting an external apparatus with the electronic device 100. For example, the external apparatus may include a wired or wireless headset jack, an external power supply (or a battery charger) port, a wired or wireless data port, a storage card port, a port for connecting an apparatus having an identification module, an audio Input/Output (I/O) port, a video I/O port, a headset jack, or the like. The interface unit 108 may be configured to receive an input (for example, data information and power) from an external apparatus and transmit the received input to one or more elements in the electronic device 100 or may be configured to transmit data between the electronic device 100 and the external apparatus.

The memory 109 may be configured to store a software program and various pieces of data. The memory 109 may mainly include a program storage area and a data storage area. The program storage area may store an operating system, an application required by at least one function (for example, a sound play function or an image display function), and the like. The data storage area may store data (for example, audio data or an address book) or the like created based on use of a mobile phone. In addition, the memory 109 may include a high-speed random access memory, and may further include a nonvolatile memory, for example, at least one magnetic disk storage device, a flash storage device, or another volatile solid-state storage device.

The processor 110 is a control center of the electronic device, connects all parts of the entire electronic device by using various interfaces and lines, and performs various functions of the electronic device and data processing by running or executing a software program and/or a module that are/is stored in the memory 109 and by invoking data stored in the memory 109, to monitor the electronic device entirely. The processor 110 may include one or more processing units. For example, the processor 110 may be integrated with an application processor and a modem processor. The application processor mainly processes an operating system, a user interface, an application program, and the like, and the modem processor mainly processes wireless communication. It can be understood that, in some embodiments, the modem processor may not be integrated into the processor 110.

The electronic device 100 may further include the power supply 111 (such as a battery) supplying power to each component. Preferably, the power supply 111 may be logically connected to the processor 110 by using a power management system, so as to implement functions such as charging management, discharging management and power consumption management by using the power management system.

In addition, the electronic device 100 includes some function modules not shown. Details are not described herein.

For example, an embodiment of the present disclosure further provides an electronic device, including the processor 110 and the memory 109 shown in FIG. 5, and a computer program that is stored in the memory 109 and that can run by the processor 110. When the computer program is executed by the processor 110, processes of the foregoing method embodiments are implemented and a same technical effect can be achieved. To avoid repetition, details are not described herein again.

An embodiment of the present disclosure further provides a computer-readable storage medium. The computer-readable storage medium stores a computer program, where when the computer program is executed by a processor, the processes of the foregoing method embodiments are implemented, and a same technical effect can be achieved. To avoid repetition, details are not described herein again. The computer-readable storage medium may be a Read-Only Memory (ROM), a Random Access Memory (RAM), a magnetic disk, a compact disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element.

Based on the descriptions of the foregoing implementation manners, a person skilled in the art may clearly understand that the foregoing method embodiments may be implemented by software in addition to a necessary universal hardware platform or by hardware only. In most circumstances, the former is a preferred implementation manner. Based on such understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the method according to the embodiments of the present disclosure.

The embodiments of the present disclosure are described above with reference to the accompanying drawings, but the present disclosure is not limited to the foregoing specific implementation manners. The foregoing specific implementation manners are merely exemplary instead of restrictive. Under enlightenment of the present disclosure, a person of ordinary skill in the art may make many forms without departing from the objective of the present disclosure and the protection scope of claims, all of which fall within the protection of the present disclosure.

The invention claimed is:

1. A power adjustment method, performed by an electronic device, wherein the method comprises:

detecting whether first information meets a first preset condition, wherein the first information comprises at least one of the following: a first retransmission rate for uplink data, an actual transmission power for uplink data, or a first maximum transmission power for uplink data, wherein the first maximum transmission power is a power threshold for transmitting the uplink data configured by a network device for the electronic device; and when the first information meets the first preset condition, using a preset power control algorithm to adjust the first maximum transmission power to a target transmission power, wherein the target transmission power is greater than the first maximum transmission power and less than or equal to an inherent maximum transmission power of a radio frequency device of the electronic device, wherein the first preset condition comprises: first duration is greater than or equal to first preset duration, the actual transmission power is less than the inherent maximum transmission power of the radio frequency device of the electronic device, and the first duration is duration for which the actual transmission power is equal to the first maximum transmission power.

2. The method according to claim 1, wherein the first preset condition further comprises at least one of the following:

the first retransmission rate is greater than or equal to a first preset threshold;

or the first maximum transmission power is less than the inherent maximum transmission power.

3. The method according to claim 1, wherein the first information further comprises at least one of the following: a first bit error rate for downlink data or first scenario information of the electronic device;

wherein the first scenario information is used to indicate at least one of the following: a screen status of the electronic device, whether the electronic device detects a user's input, a network status of the electronic device, or a current application scenario of the electronic device.

4. The method according to claim 3, wherein the first preset condition comprises at least one of the following:

the first bit error rate is less than or equal to a second preset threshold;

the electronic device is in a non-screen-off status;

the electronic device detects the user's input;

it is detected that the electronic device is in a network connection status, and duration for uplink data transmission in the network connection status is greater than or equal to second preset duration; or the current application scenario of the electronic device is a preset application scenario.

5. The method according to claim 1, wherein after the adjusting the first maximum transmission power to a target transmission power, the method further comprises:

detecting whether second information meets a second preset condition, wherein the second information comprises at least one of the following: a transmit power of the electronic device, a second retransmission rate for the uplink data, a second bit error rate for downlink data, or second scenario information, wherein the second scenario information is used to indicate at least one of the following: whether an abnormal phenomenon is detected in uplink transmission, a screen status of the electronic device, or a first application scenario in which the electronic device is currently in; and when the second information meets the second preset condition, adjusting the power threshold for transmitting the uplink data from the target transmission power to the first maximum transmission power.

6. The method according to claim 5, wherein the second preset condition comprises at least one of the following:

second duration is greater than or equal to third preset duration, and the second duration is duration for which the transmit power is less than or equal to a third preset threshold;

the second retransmission rate is less than the first retransmission rate, and a difference between the first retransmission rate and the second retransmission rate is less than or equal to a fourth preset threshold;

the second bit error rate is greater than a first bit error rate, and a difference between the second bit error rate and the first bit error rate is greater than or equal to a fifth preset threshold;

an abnormal phenomenon is detected in uplink transmission;

the electronic device is in a screen-off status, or the first application scenario is different from at least one preset application scenario indicated by preset scenario information in the electronic device.

7. An electronic device, comprising:

a memory storing computer-readable instructions; and a processor coupled to the memory and configured to execute the computer-readable instructions, wherein the computer-readable instructions, when executed by the processor, cause the processor to perform operations comprising:

detecting whether first information meets a first preset condition, wherein the first information comprises at least one of the following: a first retransmission rate for uplink data, an actual transmission power for uplink data, or a first maximum transmission power for uplink data, wherein the first maximum transmission power is a power threshold for transmitting the uplink data configured by a network device for the electronic device; and when the first information meets the first preset condition, using a preset power control algorithm to adjust the first maximum transmission power to a target transmission power, wherein the target transmission power is greater than the first maximum transmission power and less than or equal to an inherent maximum transmission power of a radio frequency device of the electronic device, wherein the first preset condition comprises: first duration is greater than or equal to first preset duration, the actual transmission power is less than the inherent maximum transmission power of the radio frequency device of the electronic device, and the first duration is duration for which the actual transmission power is equal to the first maximum transmission power.

8. The electronic device according to claim 7, wherein the first preset condition further comprises at least one of the following:

the first retransmission rate is greater than or equal to a first preset threshold;

or the first maximum transmission power is less than the inherent maximum transmission power.

9. The electronic device according to claim 7, wherein the first information further comprises at least one of the following: a first bit error rate for downlink data or first scenario information of the electronic device;
 wherein the first scenario information is used to indicate at least one of the following: a screen status of the electronic device, whether the electronic device detects a user's input, a network status of the electronic device, or a current application scenario of the electronic device.

10. The electronic device according to claim 9, wherein the first preset condition comprises at least one of the following:
 the first bit error rate is less than or equal to a second preset threshold;
 the electronic device is in a non-screen-off status;
 the electronic device detects the user's input;
 it is detected that the electronic device is in a network connection status, and duration for uplink data transmission in the network connection status is greater than or equal to second preset duration; or
 the current application scenario of the electronic device is a preset application scenario.

11. The electronic device according to claim 7, wherein after the adjusting the first maximum transmission power to a target transmission power, the operations further comprise:
 detecting whether second information meets a second preset condition, wherein the second information comprises at least one of the following: a transmit power of the electronic device, a second retransmission rate for the uplink data, a second bit error rate for downlink data, or second scenario information, wherein the second scenario information is used to indicate at least one of the following: whether an abnormal phenomenon is detected in uplink transmission, a screen status of the electronic device, or a first application scenario in which the electronic device is currently in; and
 when the second information meets the second preset condition, adjusting the power threshold for transmitting the uplink data from the target transmission power to the first maximum transmission power.

12. The electronic device according to claim 11, wherein the second preset condition comprises at least one of the following:
 second duration is greater than or equal to third preset duration, and the second duration is duration for which the transmit power is less than or equal to a third preset threshold;
 the second retransmission rate is less than the first retransmission rate, and a difference between the first retransmission rate and the second retransmission rate is less than or equal to a fourth preset threshold;
 the second bit error rate is greater than a first bit error rate, and a difference between the second bit error rate and the first bit error rate is greater than or equal to a fifth preset threshold;
 an abnormal phenomenon is detected in uplink transmission;
 the electronic device is in a screen-off status, or
 the first application scenario is different from at least one preset application scenario indicated by preset scenario information in the electronic device.

13. A non-transitory computer-readable medium storing instructions that, when executed by a processor, cause the processor to perform operations comprising:
 detecting whether first information meets a first preset condition, wherein the first information comprises at least one of the following: a first retransmission rate for uplink data, an actual transmission power for uplink data, or a first maximum transmission power for uplink data, wherein the first maximum transmission power is a power threshold for transmitting the uplink data configured by a network device for the electronic device; and
 when the first information meets the first preset condition, using a preset power control algorithm to adjust the first maximum transmission power to a target transmission power, wherein the target transmission power is greater than the first maximum transmission power and less than or equal to an inherent maximum transmission power of a radio frequency device of the electronic device, wherein the first preset condition comprises; first duration is greater than or equal to first preset duration, the actual transmission power is less than the inherent maximum transmission power of the radio frequency device of the electronic device, and the first duration is duration for which the actual transmission power is equal to the first maximum transmission power.

14. The non-transitory computer-readable medium according to claim 13, wherein the first preset condition further comprises at least one of the following:
 the first retransmission rate is greater than or equal to a first preset threshold;
 or
 the first maximum transmission power is less than the inherent maximum transmission power.

15. The non-transitory computer-readable medium according to claim 13, wherein the first information further comprises at least one of the following: a first bit error rate for downlink data or first scenario information of the electronic device;
 wherein the first scenario information is used to indicate at least one of the following: a screen status of the electronic device, whether the electronic device detects a user's input, a network status of the electronic device, or a current application scenario of the electronic device.

16. The non-transitory computer-readable medium according to claim 15, wherein the first preset condition comprises at least one of the following:
 the first bit error rate is less than or equal to a second preset threshold;
 the electronic device is in a non-screen-off status;
 the electronic device detects the user's input;
 it is detected that the electronic device is in a network connection status, and duration for uplink data transmission in the network connection status is greater than or equal to second preset duration; or
 the current application scenario of the electronic device is a preset application scenario.

17. The non-transitory computer-readable medium according to claim 13, wherein after the adjusting the first maximum transmission power to a target transmission power, the operations further comprise:
 detecting whether second information meets a second preset condition, wherein the second information comprises at least one of the following: a transmit power of the electronic device, a second retransmission rate for the uplink data, a second bit error rate for downlink data, or second scenario information, wherein the second scenario information is used to indicate at least one of the following: whether an abnormal phenomenon is detected in uplink transmission, a screen status of the electronic device, or a first application scenario in which the electronic device is currently in; and when the second information meets the second preset condition, adjusting the power threshold for transmitting the uplink data from the target transmission power to the first maximum transmission power.

18. The non-transitory computer-readable medium according to claim 17, wherein the second preset condition comprises at least one of the following:

second duration is greater than or equal to third preset duration, and the second duration is duration for which the transmit power is less than or equal to a third preset threshold;

the second retransmission rate is less than the first retransmission rate, and a difference between the first retransmission rate and the second retransmission rate is less than or equal to a fourth preset threshold;

the second bit error rate is greater than a first bit error rate, and a difference between the second bit error rate and the first bit error rate is greater than or equal to a fifth preset threshold;

an abnormal phenomenon is detected in uplink transmission;

the electronic device is in a screen-off status; or the first application scenario is different from at least one preset application scenario indicated by preset scenario information in the electronic device.

* * * * *